Patented Nov. 1, 1932

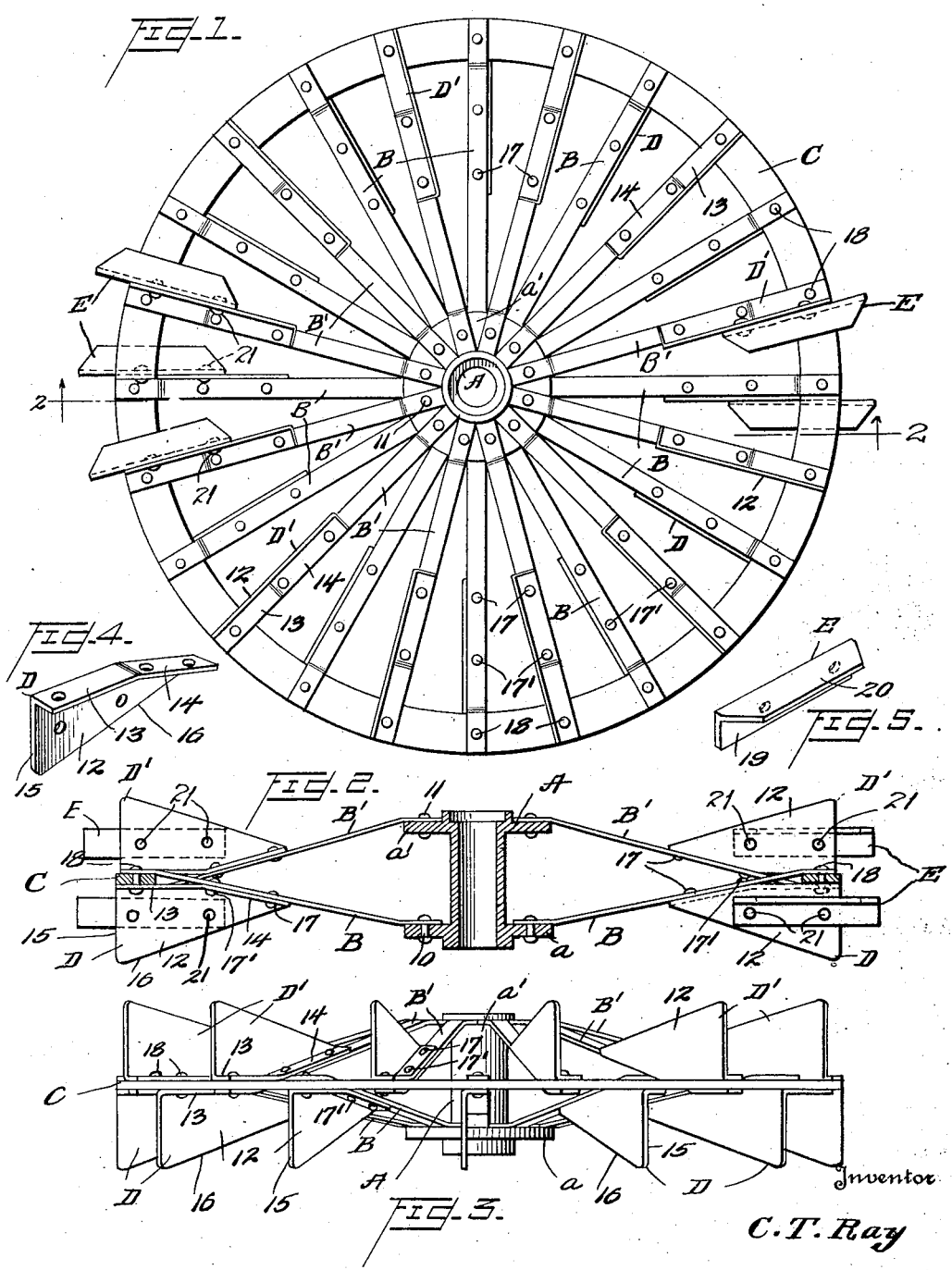

1,885,376

UNITED STATES PATENT OFFICE

CHARLES T. RAY, OF LOUISVILLE, KENTUCKY, ASSIGNOR TO B. F. AVERY & SONS, OF LOUISVILLE, KENTUCKY, A CORPORATION OF KENTUCKY

TRACTION WHEEL

Application filed February 4, 1929. Serial No. 337,386.

The preferred embodiment of this invention is illustrated in the accompanying drawing, in which:

Fig. 1 is a side elevation of the wheel showing certain of the paddles provided with detachable traction increasing spurs which may or may not be used;

Fig. 2 is a section on the line 2—2 of Fig. 1;

Fig. 3 is an edge view of the wheel in its usual condition, namely without the spurs;

Fig. 4 is a detail perspective view of one of the paddles which forms a part of the wheel tread;

Fig. 5 is a detail perspective view of one of the spurs which is detachably connectable to the wheel and is sometimes employed to give additional traction.

A wheel constructed according to this invention is composed of a hub A; a series of spokes B radiating from one end of the hub; a series of similar spokes B' radiating from the other end of the hub; a ring C disposed in a plane which intersects the hub midway between the ends of the latter and arranged between and in contact with and secured to the outer ends of the spokes B, B'; and two series of paddles D, D' which are secured to and project laterally from opposite sides of the spokes and ring and whose outer surfaces are substantially flush with the outer surface of the ring and form a wide tread adapted to either hard or soft ground.

The hub A is formed at its opposite ends with flanges a, a' to which the inner ends of the respective series of spokes B, B' are suitably secured, as by the rivets 10—11, for example. The series of spokes B at one side of the wheel are staggered with relation to the series of spokes B' at the other side of the wheel and it will be noticed that the outer ends of the respective series lie against the far sides of the ring C, the two series of spokes being relatively disposed in planes which converge from the hub A toward the ring C and cross each other adjacent the inner edge of the ring.

Each paddle D, D' consists of a substantially triangular body portion 12 formed along one of its longitudinal edges with a flange the outer portion 13 of which lies flatwise against the corresponding side of the ring C and the inner portion 14 of which extends at an inclination corresponding to that of the contiguous portion of the corresponding spoke and lies flat-wise against said portion. The outer edge 15 of each paddle provides a broad surface which forms a part of the tread of the wheel. The remaining (longitudinal) edge 16 is inclined from the outer extremity of said edge 15 to the inner terminal of the portion 14 of the flange. Each paddle is secured to the corresponding spoke by rivets 17, 17' which extend through the portion 14 of the flange of the paddle and through the spoke; and each paddle is also secured to the ring C by a rivet 18 which extends through the portion 13 of the flange and through the ring and through that portion of the outer end of its spoke which lies upon the side of the ring opposite the said flange-portion 13. In other words, the outer end of each spoke lies against one face of the ring, the portion 13 of the flange of the corresponding paddle lies against the opposite face of the ring, and the rivet 18 goes through said spoke, ring and flange-portion, thus providing a double shear on each rivet which secures the corresponding spoke and paddle to the ring, thereby making a connection possessing maximum strength and durability.

It will be noticed that the described correlation of parts produces an inexpensive and simple construction of a traction wheel having maximum durability and strength and one which possesses maximum traction in soft or plowed land and at the same time will be capable of running upon, without damaging, hard ground or roads. It will be noticed in this connection that a broad tread is formed by the outer edge of the ring and the outer edges of the paddles and that the paddles are adapted to penetrate soft ground and are capable throughout their entire depth of exercising a breaking effect upon the soil and, moreover, that there is no danger of the paddles or wheels becoming clogged even in muddy land, since the entire wheel is of open and skeleton formation and open spaces are provided throughout through which the soil may pass. In short, the wheel is self-clearing even in muddy or sticky ground. It will also be noticed that the tread or rim portion of the wheel is composed of a single ring and paddles which are secured to and project laterally from opposite sides of the ring and which ring and paddles are supported by the outer ends of spokes which brace and are braced by the ring and paddles, and that this correlation of parts contributes very substantially to the advantages possessed by this wheel.

It may at times become desirable to provide a projecting means to dig into the land when additional traction is required. The projecting means of course should be detachable since they should not be used in traveling on roads or other hard ground and their use is not necessary except in comparatively rare instances when exceptionally soft ground over which the wheel must run is encountered.

I have devised a spur particularly applicable to this wheel. It is shown in detail in Fig. 5 and is designated E. It is substantially L-shaped in cross section, being formed of two webs 19 and 20 arranged at right angles with each other. The web 19 of each of these spurs, there being one spur provided for each paddle, lies flat-wise against the face of the body 12 of the corresponding paddle and is secured thereto by bolts or other detachable fastening elements shown at 21 in Figs. 1 and 2.

Having now described the invention what I believe to be new and desire to secure by Letters Patent, is:

1. A traction wheel comprising a hub, a ring spaced from the hub, spokes connecting the hub and ring with each other, and a series of paddles whose outer ends are secured to the ring and project laterally therefrom alternately in opposite directions and whose inner ends project to a place inward of the ring and are respectively secured to the corresponding spokes, said paddles forming the major portion of the tread of the wheel, whereby the paddles and spokes mutually brace each other.

2. A traction wheel including a tread formed of a single ring and a series of paddles which project alternately in opposite directions from said ring, said wheel also including a hub and inclined spokes connecting the ring with the hub, and each of the said paddles having its outer end portion formed along one longitudinal side with a flange which engages and is secured to the corresponding side of the ring and its inner end portion formed along the same longitudinal line with a flange which engages and is secured to the corresponding spoke.

3. A traction wheel comprising a hub, a ring spaced from the hub and arranged in a plane which intersects the hub at a place substantially midway the length of the latter, two series of spokes whose inner ends respectively are secured to opposite end portions of the hub and whose outer ends are secured to opposite sides of said ring, the spokes of each series converging outwardly from the hub toward the spokes of the other series, and paddles projecting laterally in opposite directions from said ring and substantially forming the tread of the wheel, each of said paddles having its inner side flanged to provide portions which respectively lie against and are secured to the ring and a spoke.

4. A traction wheel comprising a hub, a ring spaced from the hub and arranged in a plane which intersects the hub at a place substantially midway the length of the latter, two series of spokes whose inner end portions respectively are secured to opposite end portions of the hub, and whose outer portions between the hub and ring converge to a plane which intersects the two series, each spoke extending thence to and having its outer end lying against, the contiguous side of the ring, and a series of paddles whose outer end portions extend alternately in opposite directions laterally from the ring, each of said paddles having a portion of one of its longitudinal sides secured to a corresponding spoke at a place inward of the ring and another portion of its said side arranged on the side of the ring opposite the outer end of its said corresponding spoke, and fastening means extending through the abutting portions of the ring, spokes and paddles.

5. A traction producing paddle for a traction wheel having a rim member and an inclined spoke, said paddle including an outer transverse edge to form a part of the tread of the wheel and a longitudinal edge whose outer and inner end portions are inclined with relation to each other and are flanged to provide members to be secured to said rim member and spoke, respectively.

6. An approximately triangular traction producing paddle for a traction wheel, whose base when the paddle is applied to a wheel is adapted to form a part of the tread of the wheel, and one of whose longitudinal sides has its outer end portion arranged at an angle with its inner end portion, said outer and inner end portions being flanged to provide members to be secured to an outer member of the wheel and to a spoke, respectively, the opposite side of the paddle extending at an inclination inward from the end of the base to the inner extremity of the flanged side of the paddle.

7. A traction wheel comprising a hub, a ring spaced from the hub and arranged in a plane which intersects the hub at a place substantially midway the length of the latter, two series of flat spokes arranged in a staggered relation and whose inner ends respectively are secured to opposite ends of the hub, the portions of the spokes between said hub and ring converging to a plane which intersects the two series near the inner edge of the ring, each spoke having its outer end crossing the said plane and extending to the opposite side of the ring and thence to and lying flatwise against the latter, two series of substantially triangular paddles staggered with relation to each other, and whose bases project laterally in opposite directions from the ring and form a part of the tread of the wheel, each paddle having a flanged longitudinal edge the inner end portion of which lies against and is secured to a spoke at a place between the rim and hub and the outer end portion of which lies against a side of the ring, and means to secure the spokes and paddles to said ring.

8. A traction wheel including a peripheral ring, spaced spokes whose outer ends are attached to said ring and a series of paddles whose outer transverse edges form ground-engaging parts of the tread of the wheel, each of said paddles including a body having one of its longitudinal edges formed with a flange comprising a member which lies against and is secured to a side of said ring and another member which lies against and is secured to a side of the corresponding spoke.

In testimony whereof I affix my signature.

CHARLES T. RAY.